7683X B. Hinkley,
Washing Machine,
Patented July 23, 1833
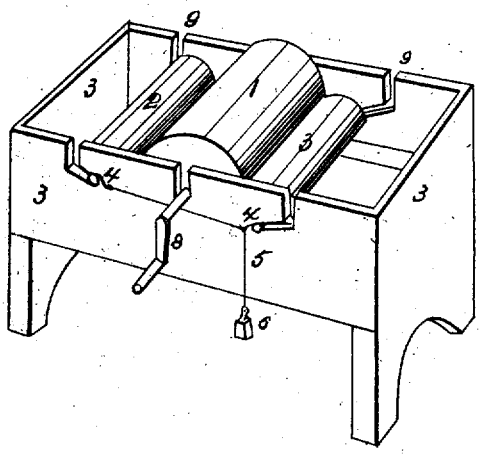

7/23/1833 7683X

July 23 1833 [illegible]

Benjamin Hinkley [illegible]

Letters Patent.

The Schedule referred to in these Letters Patent and making part of the same, containing a description in the words of the said Benjamin Hinkley himself of his improvement in the Washing machine.

Fig. 3.3.3.3. of the drawing annexed and now referred to as making a part of this description, represents the box, into which the suds are put. And in which the machine is intended to operate. This may be three feet long one foot and a half wide and one foot deep standing about two feet and a half high. In the centre of the side pieces of the box two grooves fitted with two small blocks and represented at Fig 7. are cut about an inch wide, and four inches deep, to let in the shaft of the main cylinder, one end of which shaft is bent up to form a crank Fig 8. Fig 1. of the drawing represents the main cylinder to be ten inches in diameter and eighteen inches long. Fig. 2.2 of the drawing represents two smaller cylinders about four inches in diameter, and the same length of the main cylinder & one of them on each side of the main cylinder. The smaller cylinders roll on iron gudgeons headed and running out from the sides of the box about one half an inch. On these gudgeons are placed a hook Fig 4.4. one on each. A line fig 5. is fastened into a loop of one of these hooks and runs thro' the loop of the other of these hooks and is drawn down by a weight. Fig 6. sufficiently heavy to keep the smaller cylinders pressed against the larger cylinder. Grooves g.g. running in an angle of about sixty degrees, and to the same depth of the grooves for the main cylinder, are prepared for the gudgeons of the smaller cylinder to work in. The box is filled with warm suds as high as the bottom of the smaller cylinders. The clothes are laid on to the larger cylinder and the crank is turned, changing the motion backwards and forwards so as to cleanse the clothes. The size may be varied at pleasure. What I claim as new and of my own invention are the three cylinders laying horizontal and the general arrangement of the machine.

Witnesses
John [illegible]
[illegible]

Benjamin Hinkley

[illegible]